E. BIGNELL.
METHOD AND MEANS FOR CURRENT AND CHANNEL CONTROL IN MOVING BODIES OF WATER.
APPLICATION FILED JULY 21, 1919.
1,409,140.
Patented Mar. 7, 1922.
3 SHEETS—SHEET 1.
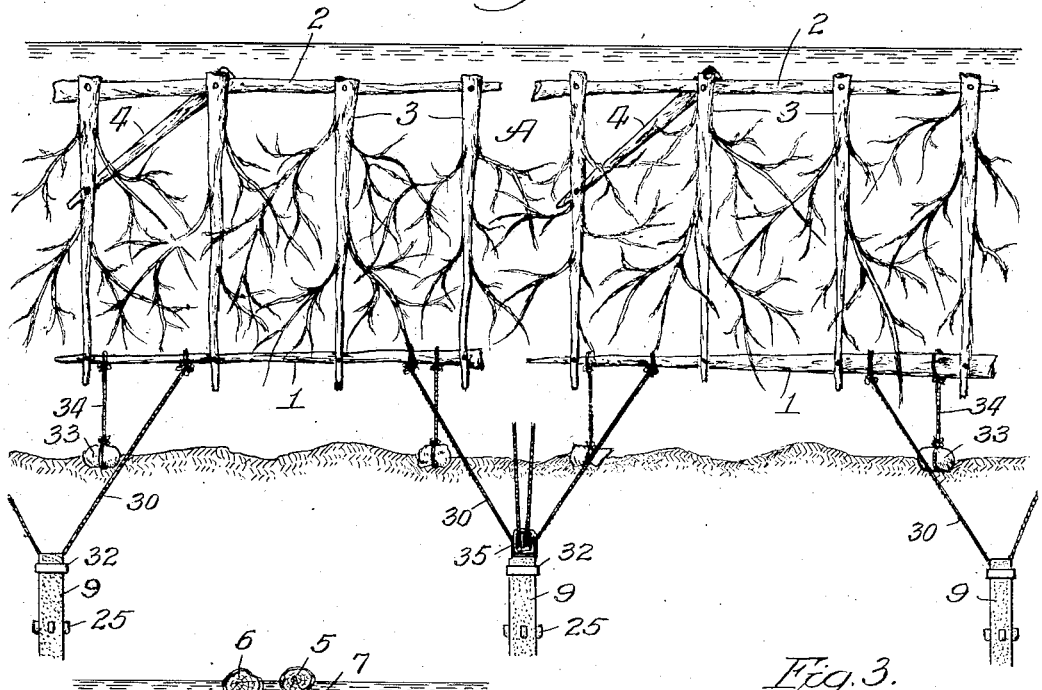
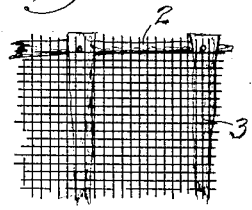
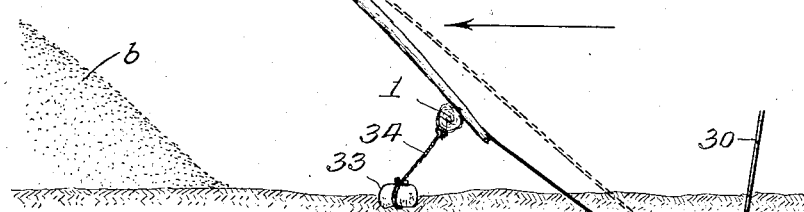
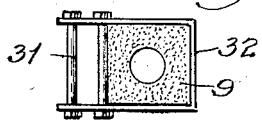
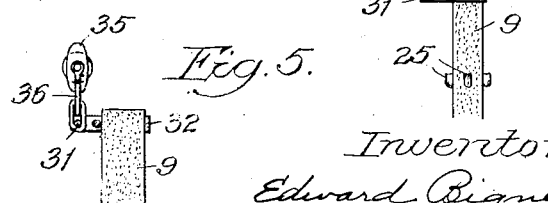
Witness:
John Enders
Frederick F. Macon
Inventor:
Edward Bignell
by Arthur C. Brown
Atty.

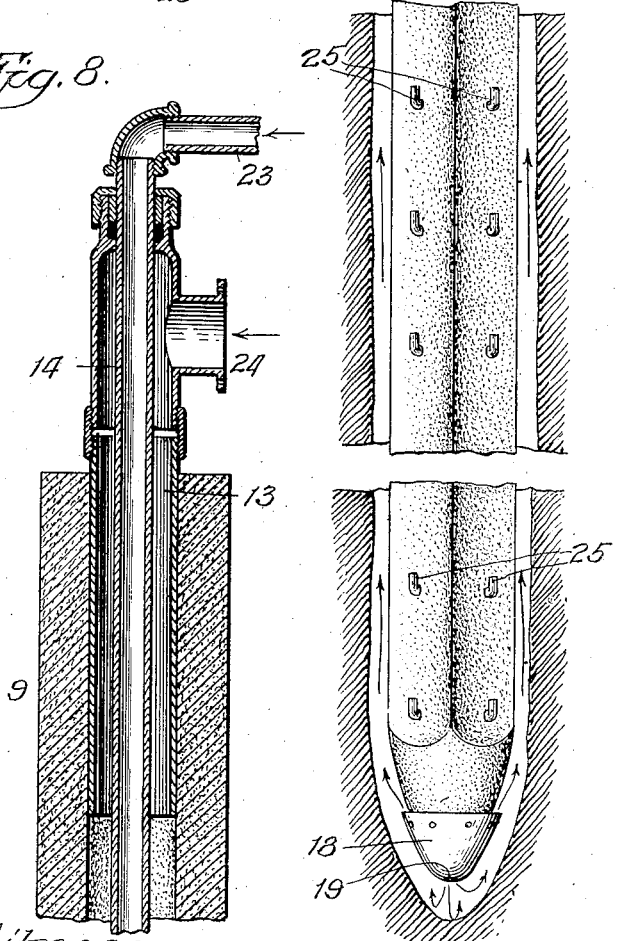

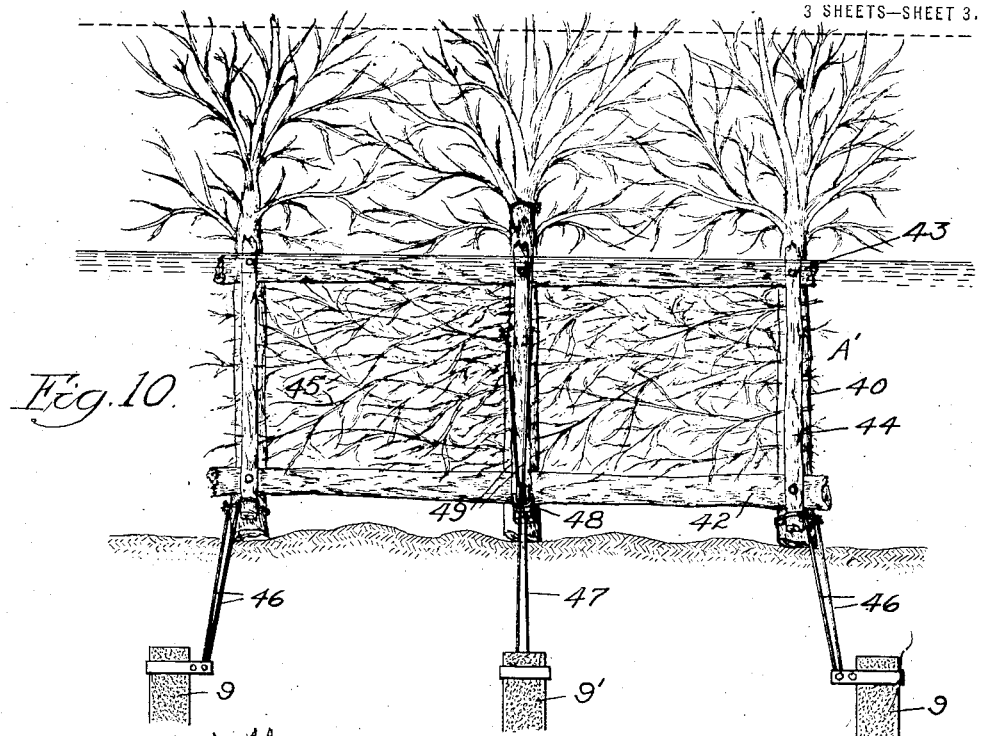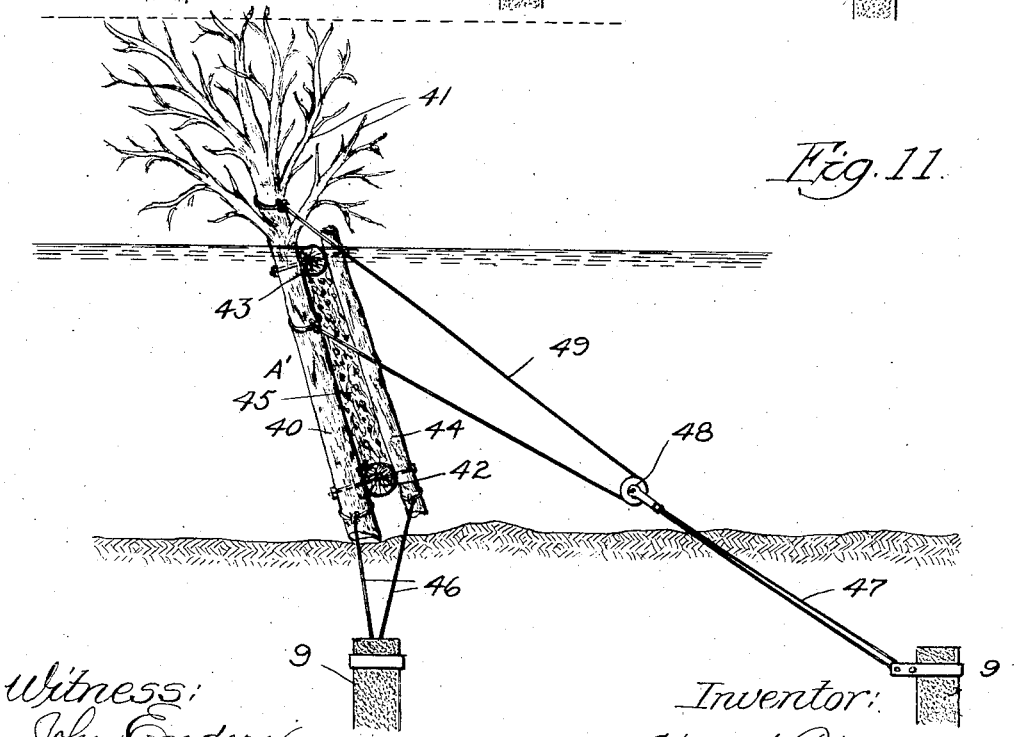

UNITED STATES PATENT OFFICE.

EDWARD BIGNELL, OF LINCOLN, NEBRASKA, ASSIGNOR TO CONCRETE PILING COMPANY, OF SEWARD, NEBRASKA, A CORPORATION OF NEBRASKA.

METHOD AND MEANS FOR CURRENT AND CHANNEL CONTROL IN MOVING BODIES OF WATER.

1,409,140. Specification of Letters Patent. Patented Mar. 7, 1922.

Application filed July 21, 1919. Serial No. 312,434.

*To all whom it may concern:*

Be it known that I, EDWARD BIGNELL, a citizen of the United States, residing at Lincoln, in the county of Lancaster and State of Nebraska, have invented certain new and useful Improvements in Methods and Means for Current and Channel Control in Moving Bodies of Water, of which the following is a specification.

This invention relates to method and means for so controlling the current in streams that accretion may be effected and erosion prevented as desired, whereby to confine waterways within their proper limits.

As is well known streams carry more or less suspended matter such as sand, silt, small gravel, and the like, the size of such particles depending on the velocity of flow of the current, the quantity of which suspended matter will be considerably greater in times of high water when the current is fast than when the stream is at a low stage and the velocity of the current low. Also when the velocity of the stream is great there will be larger particles carried than when the velocity is low. As the high velocity of flow of current decreases, the suspended particles will be deposited according to their size, the larger ones being deposited on the bed of the stream first, and the small particles carried until a sufficiently low velocity is reached to effect their deposit.

In the present invention I have made use of the above facts, and effect the building up of sand bars or the like by retarding the velocity of the current to such degree that the suspended particles can fall to the river bed, thus filling up undesirable channels in the stream and causing the current to seek a new channel.

In such streams as the Mississippi and Missouri Rivers the velocity of the current is so high that should any anchoring means be embedded in the bed of the stream with part of such anchoring means projecting above the stream bed, eddies will be created below such projecting part, the action of which will be to cut away the stream bed below the anchoring means, and such erosion will continue until the anchoring means eventually becomes unstable and topples over. In the present invention I have made use of a new form of anchoring means for securing current retarding barriers in position whereby to eliminate all danger of any current eddies, or the like, cutting away the material immediately down-stream from the anchoring means, and thus destroying its usefulness. The elimination of this objection I attain by sinking a self-sinking pile in the stream-bed to a depth below the stream bed surface and preferably to a depth to bring the top of the pile well below the maximum depth of possible scour. To this pile is attached a current retarding barrier later to be described, whereby to retard the velocity of the current and effect the deposit of alluvium as referred to above.

Among the objects of my invention therefore is to so control stream currents as to cause the deposit in any desired portion of the stream bed of alluvium.

Further to employ in this connection a novel form of current retarding barrier; further to so anchor the barrier to the stream bed as to eliminate all danger of the anchoring means washing loose in the bed of the stream as a result of swiftly flowing currents; further to employ as an anchoring means a pile sunk in the stream bed to a depth to bring its top end below the stream bed surface; further to employ for this purpose a self-sinking pile capable of being sunk to a depth well below the maximum depth of possible scour; further to provide novel means for connecting the current retarding barrier to the pile; further to make possible variation and adjustment of the angle of inclination of the barrier with relation to the stream bed; further to provide a more simple, efficacious and economical method and means of the class described; and such further objects, advantages and capabilities as will later more fully appear.

My invention further resides in the combination, construction and arrangement of parts illustrated in the accompanying drawings, and while I have shown therein a preferred embodiment of apparatus for carrying into effect my improved method, I desire it to be understood that the same, together with the method involved is susceptible of modification and change without departing from the spirit of my invention.

In the drawings:—

Fig. 1 is a sectional view taken transversely of a stream showing my improved barrier and method of anchoring the same to the stream bed.

Fig. 2 is a sectional view through the stream bed, but taken along a plane at right angles to that shown in Fig. 1.

Fig. 3 is a fragmentary side elevation of a corner of the barrier showing a modified construction.

Fig. 4 is a transverse section through the pile taken near the upper end and showing the yoke to which the control cable is secured.

Fig. 5 is a fragmentary view of the upper end of the pile showing in section a modified arrangement of control cable securing means.

Fig. 6 is a corner elevation of the self-sinking pile which I use as anchoring means for the current retarding barrier.

Fig. 7 is a transverse sectional view through the self-sinking pile showing the laterally projecting and upwardly extending pipes for assisting in the sinking thereof.

Fig. 8 is a fragmentary transverse vertical section through the pile and showing the interior arrangement of water pipes.

Fig. 9 is a fragmentary view similar to Fig. 8, but taken at the bottom end of the pile.

Fig. 10 is a transverse vertical section through the stream bed showing a modified arrangement of barrier.

Fig. 11 is a longitudinal vertical section through the stream bed and looking toward the edge of the barrier of Fig. 10.

Referring to the drawings and Figs. 1 and 2 in particular, it will be seen that my current retarding barrier, which is designated generally as A, comprises the longitudinally extending main members 1 and 2, to which are secured the cross members 3, thus forming a frame work which may be suitably braced by the corner braces 4, or other braces as desired. The cross pieces of this frame work may be tree trunks with branches remaining thereon, telegraph poles or other similar and available material as desired. In the drawings I have illustrated this frame work as comprising tree trunks still bearing the branches thereon, and which branches will extend between the cross pieces to more effectively assist in retarding the flow of the current in an obvious manner. It is, of course, understood that the cross pieces 3 may be spaced apart distances suitable to the conditions under which the barrier is to be used; the spaces between these cross pieces being greater for the higher velocities and less for the lower velocities.

In constructing the frame-work for these barriers they may be covered with such reticulated material as wire netting, wire fencing, or the like, to further assist in the retardation of the current velocity, if desired.

It is desirable for the more perfect utilization of this barrier that the upper portion thereof float more or less near the surface of the water, and for the accomplishment of this purpose the upper longitudinal member 2 is of a very buoyant nature, while the remaining portions of the framework may be less buoyant in nature if desired.

Secured to this top member 2 are the additional floating members 5 and 6, which are secured to the member 2 by means of the flexible connections 7 and 8, whereby when the barrier has become embedded in the sand or deposited material up to the member 2, the members 5 and 6 may float still higher, and thus increase the height to which the sand bar may be formed.

In order to eliminate any necessity whatever for using piles that might be found incapable of being driven to the desired depth I make use as an anchoring means for the current retarding barrier, of self-sinking piles 9, which may be sunk in the stream at any desirable distance apart as conditions may require, and to a depth not only to bring the top of the pile below the stream bed, but preferably to such depth that it will be well below the maximum depth of possible scour whereby to eliminate all possible danger of the pile becoming loosened, or its efficiency otherwise impaired by the eroding action of the stream upon the stream bed.

The form of self-sinking pile shown herein is that covered in my United States Patent No. 1,241,813, issued to me October 2, 1917, and is shown herein to set forth one convenient form of pile for reducing to practice the present invention. This pile in general is preformed from concrete and comprises the body portion 10, having a central longitudinal opening 11, within which is mounted the sleeves 12 and 13 positioned adjacent the bottom and top portions of the pile respectively, as shown. Centrally positioned with relation to the sleeves 12 and 13 and opening 11, is the pipe 14, around which pipe is the space 15. Threaded to the lower end of the sleeve 12 is the reducing nipple 16, within which the lower end of the pipe 14 is secured, in such manner as to project therethrough and receive upon its projecting end the nose portion 17. Secured to the nose portion and suitably spaced therefrom is the nozzle 18, having a central aperture 19, and the nozzle is so spaced from the nose 17 as to provide the upwardly extending passageways 20 around its periphery. Extending laterally of the body of the pile, at each face thereof, are the pipes 21, which at their outer end are turned upwardly to lie closely against the respective faces of the pile, and so spaced as to step upwardly any material loosened in the action of the nozzle 18. The pipe 14 and the longitudinal passageway 15 are connected to suitable sources of water supply by means of suitable lengths of hose 23 and 24, respectively.

As is clearly described in my former Letters Patent referred to above, a stream of water under considerable pressure is forced through the pipe 14 and channel 15, whereby that through the pipe 14 will be forcibly conducted into the nozzle 18, a portion of which will pass through the opening 19 and dig away the material below the pile, and that portion which passes up through the passageway 20 will start this loosened material on its upward journey, the continuance of which upward journey will be effected by the upwardly projecting ends 25 of the lateral pipes 22.

By making use of a self-sinking pile I am enabled to quickly and readily drive the same to such depth in the stream bed as to be well below any possible scour, and thus effectively anchor the current retarding barrier in permanent position. Before the pile is driven to its final depth a control cable 30 is passed around the rod 31 of the yoke 32, which is secured adjacent the top end of the pile, and both ends of this cable are retained in the boat or other floating means above the water. As soon as the pile is sunk to final position, one end of this control cable 30 is secured to the lower longitudinal member 1 of the barrier (it being understood that there will be as many piles and associated cables as conditions may require), and after the barrier has been properly positioned and spaced from the pile, the free end of the cable 30 is then brought to the barrier and secured thereto at any suitable position, preferably adjacent its upper portion. In order to further assist in steadying the barrier in the stream, I make use of the additional anchoring or steadying means 33, which may be a rock or other suitable weight secured to the lower portion of the barrier by means of the cable 34, and any number of these may be employed as conditions may require.

It is to be observed that in addition to the current being permitted to pass through the openings in the barrier (which will result in the retardation of the velocity thereof) portions of the current will also pass underneath the barrier, and in addition to depositing its suspended particles below the barrier from retarding velocity, will also tend to pile up such suspended particles below the barrier, much in the same manner as snow is piled up on the leeward side of a fence, having an opening along its lower portion through which the wind and snow passes. While in Fig. 2 I have shown the sand bar $b$ as being formed more or less close to the barrier, it is to be understood that the formation of such sand bar may occur at suitable distances down stream from the barrier, this being determined by how equally and quickly the suspended particles will be deposited after the velocity of the current has been retarded by passing through the barrier.

In Fig. 5 I have shown a modified form of means for securing the control cable 30 to the pile, and which in this figure comprises the pulley block 35 secured by the link 36 to the rod 31. This pulley block may consist of a single sheave or any greater number thereof as desired.

In Figs. 10 and 11, is illustrated a modified form and arrangement of retarding barrier in which the barrier A' comprises the tree trunks 40, having the branches 41 remaining thereon. These trunks are suitably secured together at spaced intervals by the cross pieces 42 and 43 which are positioned between the trunks 40 and the members 44. Suitably secured between the trunks 40 and members 44 are branches 45 or other suitable material which will provide spaces to permit the flow of water therethrough.

Secured adjacent the bottoms of the tree trunks 40 and the members 44, are the cables 46 which, at their other ends, are fastened to the piles 9, sunk with their tops below the depth of maximum scour as described above. The cables 46 may be of a length to hold the tree trunk bottoms against the bottom of the stream or of a greater length to permit the same to occupy any desired position thereabove, the particular length used being a matter of choice and to suit existing conditions. Spaced upstream from the piles 9, are other piles 9' of a similar construction and sunk to a similar depth, and having secured in the manner illustrated, adjacent their upper ends the cable 47, which projects a suitable distance above the stream bed and has secured thereto the sheave 48, over which is threaded the cable 49, which in turn is secured as illustrated to the barrier at points suitably removed from the bottoms of the tree trunks.

With this arrangement the inclination of the tree trunks with the stream bed may be varied as desired whereby the barriers may be laid down, that is, positioned to permit their tops to be below the surface of the water during such periods as ice or the like may be floating, and raised at other times to bring the tree tops above the surface of the water whereby to render the barriers effective during high water to effect the deposit of suspended material below the barrier and the creation of sand bars to the high water line if desired.

As is preferred, the barrier may be caused to assume any position between that, parallel with the stream bed and perpendicular thereto. Such adjustment or variation of inclination being effected by merely loosening one end of the cable 49, changing the angle of inclination as desired and then refastening the loosened end of the cable again to the barrier to hold the barrier in its new position.

These carriers will preferably be positioned at substantially right angles to the bank of the stream and any desired number spaced longitudinally of the stream whereby the current velocity will be retarded in steps as the current encounters the successive barriers. By placing these devices in those portions of streams where undesirable erosion and cutting away of the bed or banks is occurring, not only are sand or other bars formed to fill up the channel at such portions but the stream is deflected and caused to seek a new channel in a more appropriate location.

While I have more particularly described my invention in connection with rivers, I wish it to be understood that the same is susceptible of application in connection with building up bars, and the like, along the sea shore, lake shores, in harbors, and the like.

Having now described my invention, I claim :—

1. A device of the class described comprising a pile or piles sunk in the bed of a flowing body of water to a depth below the maximum scour of the water, flexible means attached thereto and extending upwardly therefrom, a foraminous barrier secured to said flexible means for initially retarding the flow of water and arresting the movement of sand and other solids carried by or suspended in the water, whereby earth bars are created and maintained and shores built up and the flow of water diverted to other channels.

2. The method of creating and maintaining bars or shores in or adjacent bodies of water, for the purpose of changing the channel or shore lines, which consists in placing a self sinking pile or piles having flexible means extending upwardly therefrom, well below the maximum scour of the water and attaching to that portion of said flexible means away from the pile or piles, a foraminous barrier so that the solid particles carried by the water will be so retarded as to be deposited and retained on both sides of the barrier, and a permanent bar of earth, sand, or the like, thereby created and maintained.

3. In apparatus of the class described, a self sinking pile sunk in the bed of a body of water to a depth below the maximum scour caused by the movement of the water, a foraminous barrier for retarding the flow of water to a degree to cause the deposit of carried particles and build up a bar or bars to divert the water to other channels, and means for securing said barrier to the pile.

4. In apparatus for creating and maintaining bars or shores in or adjacent moving bodies of water, a pile or piles sunk in the bed thereof to a depth below the maximum scour of the moving water, an open work retarding barrier for decreasing the velocity of the water sufficiently to cause suspended solid particles carried by the moving water to be deposited on said bed to build up a bar or bars to divert the flow of water to other channels, and means adjacent the upper end of the pile or piles for securing said barrier thereto.

5. In apparatus of the class described, a self sinking pile or piles sunk in the bed of a body of water to a depth to bring their major portion below the maximum scour of the moving water, and the top of the pile below the bed of the stream, an open work retarding barrier positioned adjacent said pile or piles for retarding the movement of the water to a degree to cause the deposit on said bed of suspended solid particles carried by the water, and means for securing said barrier to said pile or piles.

6. In apparatus of the class described, a pile or piles sunk in the bed of a moving body of water to a depth to bring their major portion below the maximum scour of the water, and the top below the bed of the stream, an open work retarding barrier positioned adjacent said pile or piles for retarding the movement of the water to a degree to cause the deposit on said bed of suspended solid particles carried by the water, and means for securing said barrier to said pile or piles, a further pile or piles spaced from said first mentioned pile or piles also sunk with their major portion below the maximum scour of the moving water, and adjusting means connecting said barrier and said further pile or piles to adjust the inclination of the barrier as desired.

7. In apparatus of the class described, a pile sunk in the bed of a moving body of water to a depth below the maximum scour of the moving water, a foraminous barrier for retarding the flow of water to a degree to cause the deposit of carried particles and build up a bar or bars to divert the flow of water to other channels, means for securing said barrier to the pile, and means for holding said barrier at the desired inclination with relation to said bed.

8. The method of controlling channels, shore lines, and the like, which consists in sinking in the bed of a body of moving water a pile or piles to a depth below the maximum scour of the water, and securing to said pile or piles an open work barrier to retard the velocity of the moving water to cause the deposit of particles carried thereby.

In testimony whereof I affix my signature.

EDWARD BIGNELL,